United States Patent
Dixon, III et al.

(10) Patent No.: US 7,257,819 B1
(45) Date of Patent: Aug. 14, 2007

(54) METHOD AND SYSTEM FOR DISPATCHING SERVICE REQUESTS TO SUB-APPLICATIONS

(75) Inventors: Walter Dixon, III, Delanson, NY (US); Daniel Morrill, Clifton Park, NY (US)

(73) Assignee: General Electric Capital Corporation, Stamford, CT (US)

( * ) Notice: Subject to any disclaimer, the term of this patent is extended or adjusted under 35 U.S.C. 154(b) by 1024 days.

(21) Appl. No.: 09/845,750

(22) Filed: Apr. 30, 2001

(51) Int. Cl.
*G06F 9/54* (2006.01)
*G06F 9/44* (2006.01)

(52) U.S. Cl. .................. 719/316; 719/311; 719/330

(58) Field of Classification Search ............... 709/227; 718/102; 719/315, 330, 311, 316; 717/101
See application file for complete search history.

(56) References Cited

U.S. PATENT DOCUMENTS

| | | | |
|---|---|---|---|
| 6,012,090 A * | 1/2000 | Chung et al. ............... 709/219 |
| 6,173,327 B1 * | 1/2001 | De Borst et al. ........... 709/231 |
| 6,718,535 B1 * | 4/2004 | Underwood ................ 717/101 |
| 6,732,139 B1 * | 5/2004 | Dillenberger et al. ....... 718/102 |
| 6,732,175 B1 * | 5/2004 | Abjanic ..................... 709/227 |
| 6,813,769 B1 * | 11/2004 | Limprecht et al. .......... 719/315 |
| 7,028,312 B1 * | 4/2006 | Merrick et al. ............. 719/330 |

\* cited by examiner

*Primary Examiner*—Meng-Al T. An
*Assistant Examiner*—Li Zhen
(74) *Attorney, Agent, or Firm*—Buckley, Maschoff & Talwalkar LLC

(57) ABSTRACT

A dispatching system that uses a common interface to interface with all sub-applications, regardless of their logic models. The common interface provides a service method or routine that the dispatching system invokes to effect processing by the sub-application. Each sub-application implements the common interface and shares a common context with the other sub-applications. In one embodiment, the dispatching system receives requests (e.g., HTTP requests), identifies the sub-applications that should process the received requests, and invokes the service routines of the identified sub-applications to process the received requests. Each sub-application may have an associated match criteria that indicates when the sub-application should process the requests.

6 Claims, 4 Drawing Sheets

METHOD AND SYSTEM FOR DISPATCHING SERVICE REQUESTS TO SUB-APPLICATIONS

TECHNICAL FIELD

The described technology relates generally to installable sub-applications and particularly to installable sub-applications using different logic models.

BACKGROUND

Many companies are now allowing their customers to remotely access their computer systems. These companies believe that the providing of such access will give the company an advantage over their competitors. For example, they believe that a customer may be more likely to order from a company that provides computer systems through which that customer can submit and then track their orders. The applications for these computer systems may have been developed by the companies specially to provide information or services that the customers can remotely access, or the applications may have been used internally by the companies and are now being made available to the customers. For example, a company may have previously used an application internally to identify an optimum configuration for equipment that is to be delivered to a particular customer's site. By making such an application available to the customer, the customer is able to identify the optimum configuration themselves based on their current requirements, which may not be necessarily known to the company. The rapid growth of the Internet and its ease of use has helped to spur making such remote access available to customers.

Because of the substantial benefits from providing such remote access, companies often find that various groups within the company undertake independent efforts to provide their customers with access to their applications. As a result, a company may find that these groups may have used very different and incompatible logic models. For example, one application may be based on a request-response logic model, and another application may be a legacy system that performs processing of data provided in a file. A company may want to provide the functionality of both applications to its customers through a single and consistent user interface so that these applications appear to the customers as a single "overall application." It may, however, be very difficult, time consuming, and error prone to combine the functionality of both applications into a single application. It would thus be desirable to have a technique that would allow applications that use disparate logic models to provide the appearance of a single overall application.

DETAILED DESCRIPTION

Figure 1:
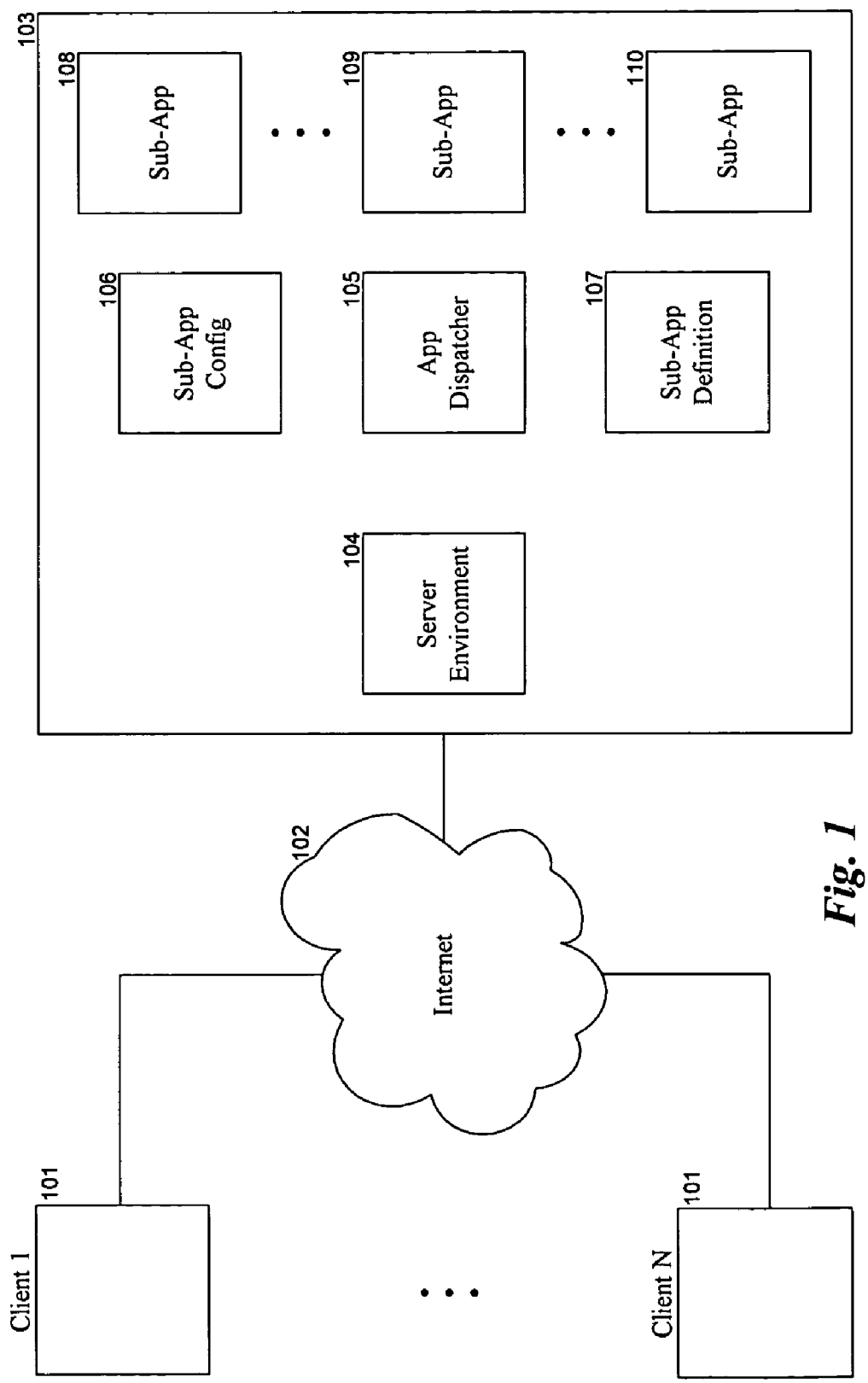
FIG. 1 is a block diagram illustrating components of the dispatching system in one embodiment.

A method and system for dispatching requests to sub-applications that use disparate logic models within the context of an application executing in a server environment is provided. The sub-applications form an application and share the same application context. The dispatching system allows sub-applications implemented with disparate logic models to share context information and thus function cooperatively as an application. The logic models may be the action-view model as described in U.S. patent application Ser. No. 09/753,037, entitled "Application Architecture," filed on Dec. 28, 2000 and the interaction model as described in U.S. patent application Ser. No. 09/681,567, entitled "Method and System for Executing a Computer Program," (now U.S. Pat. No. 6,944,851) filed concurrently with this application, both of which are hereby incorporated by reference. Other logic models may include workflow-based models. The term "logic model" refers to the overall architecture of a sub-application. In one embodiment, the dispatching system uses a common interface to interface with all sub-applications, regardless of their logic models. The common interface provides a service method or routine that the dispatching system invokes to effect processing by the sub-application. Each sub-application implements the common interface. In one embodiment, the dispatching system receives requests (e.g., HTTP requests), identifies the sub-applications that should process the received requests, and invokes the service routine of the identified sub-applications to process the received requests. Each sub-application may have an associated match criteria that indicates when the sub-application should process the requests. The dispatching system applies the match criteria of the sub-applications to received requests to determine whether the associated sub-applications should process the requests. For example, a match criteria may be a regular expression (e.g., "*.html") that is applied to the uniform resource locator ("URL") of an HTTP request. The dispatching system processes the sub-applications in an order that may be predefined. The dispatching system selects the first sub-application and applies the match criteria associated with the first sub-application to the received request. If a match is found, then the dispatching system invokes the service routine of the first sub-application. When the first sub-application completes its processing, the dispatching system then selects the second sub-application and applies the matching criteria associated with the second sub-application to the received request. The dispatching system continues this process until all the sub-applications have been processed. In one embodiment, a sub-application may return an indication that the dispatching system should not process any additional sub-applications for the received request. For example, a sub-application that implements user authentication may prevent additional sub-applications from being processed when the authentication sub-application cannot authenticate the user who sent the request. The dispatching system may also stop processing additional sub-applications when a sub-application provides a response to the received request. In this way, application programs that are independently developed using different logic models can be combined to provide an overall application with the dispatching system invoking the service routine of the sub-applications as indicated by the match criteria. Moreover, legacy applications can be encapsulated within the common interface so that they can be combined with sub-applications that use different logic models.

In one embodiment, the dispatching system during its initialization instantiates objects that implement the different sub-applications that compose the overall application. This initialization may be based on information stored in a configuration file. The configuration file, which may be in an XML format, may contain an entry for each sub-application. Each entry may identify an object class associated with the sub-application, initialization parameters associated with the sub-application, and the match criteria for the sub-application. During initialization, the dispatching system retrieves each entry and instantiates an object of the object class associated with that the sub-application. The object class defines a "service" method or routine that the dispatching system invokes to have the sub-application process requests. The dispatching system initializes the instantiated object with the initialization parameters of the configuration file. In one embodiment, the entries in the configuration file are ordered, and the dispatching system processes the sub-applications when a request is received in the specified order. The phrase "processing a sub-application" refers to evaluating the match criteria for that sub-application and invoking the service routine of that sub-application when a match is found.

The sub-applications share the same application context. This allows the sub-applications to share global data (as attributes) and to shared services such as database connections and connections to a workflow server. When a sub-application of an overall application is initialized, it is passed a configuration object through which the sub-application can access an application context object. The application context object provides methods for setting and getting the values of attributes associated with the application context. The application context object includes a lookup method to provide access to the shared services. The application context object also includes a method to retrieve a dispatcher object that is used to process and send the presentation data.

Figure 2:
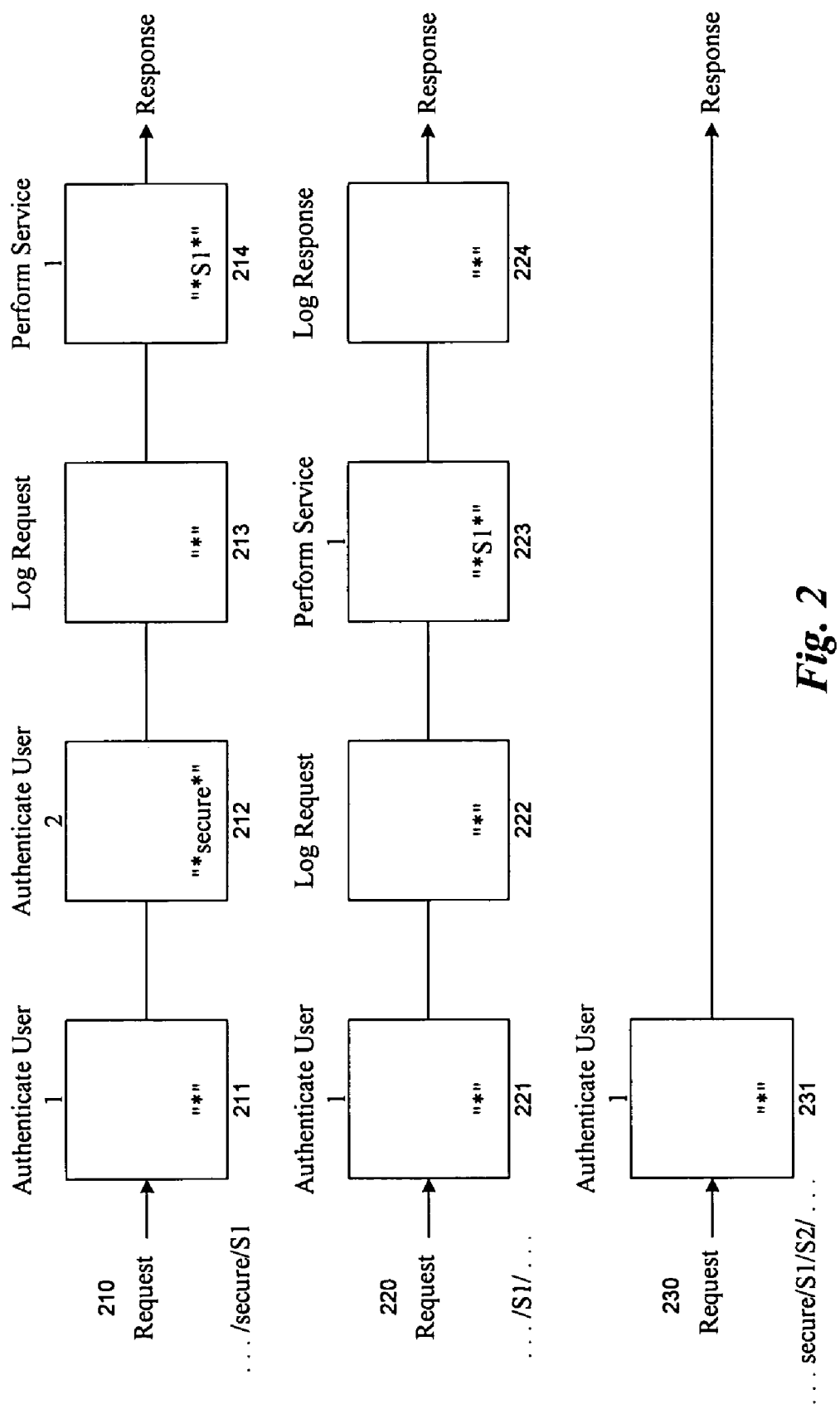
FIG. 2 is a block diagram illustrating the invocation of sub-applications in one embodiment.

FIG. 1 is a block diagram illustrating components of the dispatching system in one embodiment. The client computers 101 are connected to a web server 103 via the Internet 102. The client computers may have conventional browsers for interacting with the web server. The web server includes a server environment 104 and the dispatching system comprising the dispatcher 105, the sub-application configuration file 106, the sub-application definition file 107, and the application comprising sub-applications 108, 109, and 110. The server environment receives HTTP requests from the client computers and invokes the appropriate application to handle the request. In this case, the server environment invokes the dispatcher. The server environment then transmits responses provided by the dispatcher to the client computers. The dispatcher operates within a server environment that provides services to web-based applications. When the dispatcher receives a request, it processes the sub-applications serially. The invoked sub-applications process the request and optionally return a response. The sub-application configuration file contains an entry for each sub-application that includes an indication of the match criteria, object class, and initialization parameters for that sub-application. The sub-application definition file contains the class definitions for the sub-applications. The computer systems may include a main memory, a central processing unit, input devices (e.g., keyboard input devices), output devices (e.g., display devices), and storage devices, such as a hard drive, a CD-ROM, or floppy disk drive. The main memory and storage devices are computer-readable media that may contain instructions for implementing the dispatching system. Also, one skilled in the art will appreciate that various communication channels can be used to interconnect the web server and the client computers such as the Internet, a wide area network, or point-to-point, dial-up connections FIG. 2 is a block diagram illustrating the processing of sub-applications in one embodiment. The sub-application sequences 210, 220, and 230 illustrate the invocation of sub-applications when a request is received by the dispatcher. The overall application comprises six sub-applications ordered as follows: Authenticate User 1 ("*"), Authenticate User 2 ("*secure*"), Log Request ("*"), Perform Service 1 ("*S1*"), Perform Service 2 ("*S2*"), and Log Response ("*"). The parentheticals indicate the match criteria for each sub-application. The match criteria of "*" indicates that all URLs match, and the match criteria of "*secure*" indicates that only those URLs that include the word "secure" match. The Authenticate User 1 and Authenticate User 2 sub-applications perform user authentication. The Log Request sub-application stores the request in a log file. The Perform Service 1 and Perform Service 2 sub-applications perform the business behavior. The Log Response sub-application logs the response. Referring to sub-application sequence 210, the dispatcher receives the request " . . . /secure/s1" and determines that the match criteria of Authenticate User 1 sub-application 211, Authenticate User 2 sub-application 212, Log Request sub-application 213, and Perform Service 1 sub-application 214. The match criteria Log Response sub-application also matches the received request but is not processed because the Perform Service 1 sub-application 214 returned an indication not to process any additional sub-applications. If the Authenticate User 2 sub-application 212 returned an indication not to process any additional sub-applications because the user could not be authenticated, then the dispatcher would not have processed the Log Request sub-application 213 or the Perform Service 1 sub-application 214. Referring to sub-application sequence 220, the dispatcher receives the request of " . . . /S1/ . . . " and determines that the match criteria of the Authenticate User 1 sub-application 221, the Log Request sub-application 222, the Perform Services 1 sub-application 223, and the Log Response sub-application match the received request. The dispatcher then invokes the sub-applications in the sequence. Referring to sub-application sequence 230, the dispatcher receives the request of " . . . secure/S1/S2" and determines that the match criteria of all the sub-applications match the received request. The Authenticate User 1 sub-application 231 returns an indication that no additional sub-applications should be processed by the dispatcher because the user could not be authenticated. As a result, the dispatcher does not process any additional sub-applications.

Table 1 contains an example portion of the configuration file for sub-applications. Lines 1-17 define the sub-applications. Lines 1-6 contain the definition of the Authenticate User 1 sub-application. The model element contains the name attribute for the name of the sub-application and a class-name attribute for the name of the class associated with the sub-application. The init-param element defines a parameter to be passed when the object that implements the sub-application is instantiated. The init-param element indicates that the parameter of "db" should be initialized to "user security.db." Lines 19-22 define the match criteria for the sub-applications. Line 19 defines that the match criteria for the Authenticate User 1 sub-application. The pattern attribute indicates a match criteria of "*" and the model-ref attribute identifies the Authenticate User 1 sub-application.

TABLE 1

1. <model name="AuthenticateUser1"class-name="authenticateuser1">
2.    <init-param>
3.       <param-name>db</param-name>
4.       <param-value>usersecurity.db</param-value>
5.    </init-param>
6. </model>
7.
8. <model name= "AuthenticateUser2" class-name="authenticateuser2"/>
9.
10. <model name="LogResponse" class-name="logresponse">
11.
12. <model name="PerformService1" class-name="businessapp1">
13.    <init-param>
14.       <param-name>db</param-name>
15.       <param-value>equipment.db</param-value>
16.    </init-param>
17. </model>
18. . . .
19. <model-map pattern="*" model-ref="AuthenticateUser1"/>
20. <model-map pattern="*secure*" model-ref="AuthenticateUser2"/>
21. <model-map pattern="*" model-ref="LogRequest"/>
22. <model-map pattern="*s1*" model-ref="PerformService1"/>
23. . . .

Table 2 defines the methods of the interface implemented by the sub-applications in one embodiment. The dispatcher interacts with the sub-applications using this interface. One skilled in the art will appreciate that different methods may be included in the interface. For example, the interface may provide a match method that the dispatcher invokes to see if the match criteria of the sub-application matches the request.

TABLE 2 getConfig( )
   Returns a Config object, which gives a sub-application its
   initialization parameters.
   Specified by getConfig in interface Model
java.lang.String getName( )
   Returns Name of class implementing the model.
   Specified by getName in interface Config
ApplicationContext getApplicationContext( )
   Returns a reference to the ApplicationContext in which the
   sub-application is executing.
   Specified by getApplicationContext in interface Config
java.lang.String getInitParameter(java.lang.String name)
   Returns a String containing the value of the named initialization
   parameter, or null if the parameter does not exist.
   Specified by getInitParameter in interface Config
   Parameters:
      name - the name of the initialization parameter
java.util.Iterator getInitParameterNames( )
   Returns the names of the sub-application's initialization parameters as
   an Iterator of String objects, or an empty Iterator if the sub-
   application has no initialization parameters.
   Specified by getInitParameterNames in interface Config
void init (Config config)
   Called by the dispatcher to indicate to a sub-application that it is
   being placed into service. The dispatcher calls the init method once
   after instantiating the sub-application. The init method needs to
   complete successfully before the sub-application can receive any
   requests.
   Parameters:
      config - an object containing the sub-application's configuration
      and initialization parameters. Also provides a reference to the
      ApplicationContext object that enables access to sub-application
      services.
void init( )
   Convience method so sub-application needing initialization need to be
   passed a Config object.
void service (Request request, Response response)

TABLE 2-continued

Called by the dispatcher to allow an model to respond to a request.
   This method is called after the sub-application's init method has
   completed successfully. Sub-applications run inside a multithreaded
   environment in which multiple requests are handled concurrently.
   Access to the sub-application's class and instance variable should be
   synchronized if they are updateable within the service method.
   Parameters:
      request - a Request object that contains the request message.
      response - a Response object that contains the response message.
void destroy( )
   Called by the dispatcher to indicate a sub-application that it is being
   taken out of service.

Table 3 defines the methods of the interface for the application context.

The interface provides access to resources that include registered services, named objects managed by the application environment, the server environment, resource bundles, and the class loaders. Each overall application executes within its own context. Every sub-application within an overall application is passed a reference to the Application-Context instance giving it access to all resources available within the overall application.

TABLE 3 lookup(java.lang.String name)
   Retrieves a named object. This method provides a consistent means
   of accessing named objects within the overall application. A named
   object differs from an attribute in that an attribute is application-
   specific, and contains data meaningful only to the application,
   whereas named objects are managed by the application environment
   and provide functionality or services that the sub-applications can
   take advantage of.
   Parameters:
      name - the name of the object to look up.
      Returns the object bound to name.
getContainerContext( )
   Returns the context object supported by the underlying container.
   This method allows access to a container specific implementation of
   the context object, which may provide more concrete methods to
   interact with the context.
   Returns a context object supported by the underlying container.
getRequestDispatcher(java.lang.String path)
   Returns a RequestDispatcher object that acts as a wrapper for the
   resource located at the given path. This method returns null if the
   ApplicationContext cannot return a RequestDispatcher for any reason.
   Parameters:
      path - a String specifying the pathname to the resource
      Returns a RequestDispatcher object that acts as a wrapper for the
      resource at the specified path.
getResource(java.lang.String path)
   Returns a URL to the resource located at the named path. This
   method returns null if the resource specified by the named path does
   not exist. The rules governing the application's ability to manipulate
   the resource are dependent on the underlying container.
   Parameters:
      path - description of parameter
      Returns the URL for the resource, or null if the resource does
      not exist.
getResourceAsStream(java.lang.String path)
   Returns the resource located at the named path as an InputStream
   object. This method returns null if the resource specified y the named
   path does not exist
   Parameters:
      path - description of parameter
      Returns the InputStream for the resource, or null if the resource
      does not exist.
getRealPath(java.lang.String path)
   Returns a String containing the real path of a given virtual path. this
   method returns null if the virtual path cannot be translated.
   Parameters:
      path - a String specifying a virtual path
      Returns a String specifying the real path, or null if the translation
      cannot be performed.

Figure 3:
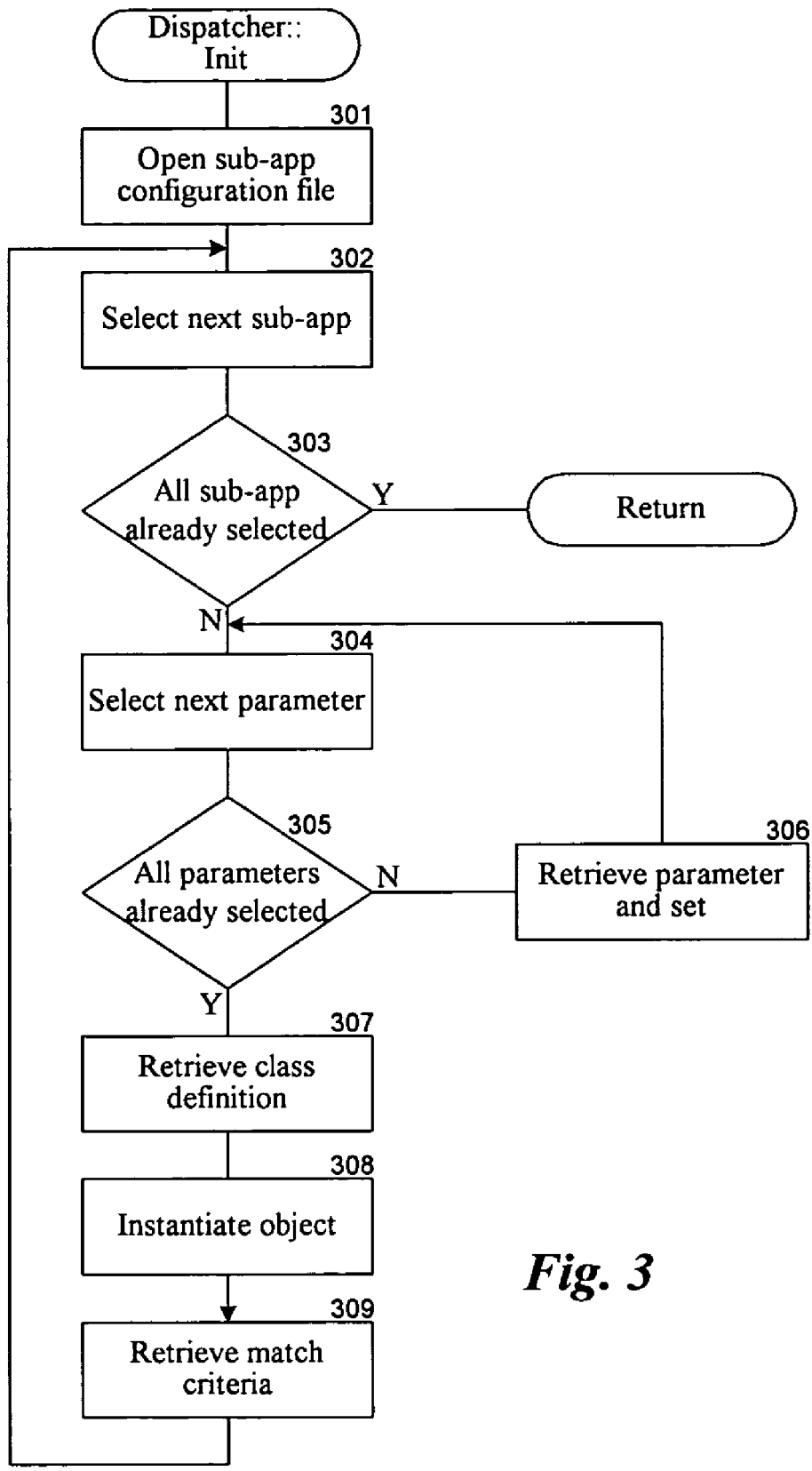
FIG. 3 is a flow diagram illustrating the processing of the initialization routine of the dispatcher in one embodiment.

TABLE 3-continued getContainerInfo( )
    Returns information about the container.
    Returns a String containing container information.
getInitParameter
    Returns a String containing the value of the named initialization
    parameter, or null if the parameter does not exist.
    Parameters:
        name - a String containing the name of the requested parameter
        Returns a String value for the named parameter.
getInitParameterNames( )
    Returns an Iterator over the initialization parameters names available
    within this context.
    Returns an Iterator of initialization parameter names.
getAttribute(java.lang.String name)
    Returns the attribute with the given name, or null if there is no
    attribute by that name. The attribute is returned as a java.lang.Object
    or some subclass.
    Parameters:
        name - a String specifying the name of the attribute.
        Return an Object containing the value of the attribute, or null if
        not attribute exists matching the given name.
getAttributeNames( )
    Returns an Iterator over the attribute names available within this
    context.
    Returns an Iterator over attribute names.
removeAttribute(java.lang.String name)
    Removes the attribute with the given name from the context. After
    removal, subsequent calls to getAttribute to retrieve the attribute's
    value will return null.
    Parameters:
        name - a String specifying the name of the attribute to be
        removed.
set Attribute  (java.lang.String name,
            java.lang.Object object)
    Binds an object to a given attribute name in this context. If the name
    specified is already used for an attribute, this method will remove the
    old attribute and bind the name to the new attribute.
    Parameters:
        name - a String specifying the name of the attribute
        object - an Object representing the attribute to be bound.
registerLookupDelegate
    Registers a LookupDelegate to be used in calls to lookup( ). The
    lookup( ) method retrieves references to named resources. Multiple
    sources can be defined to perform those lookups by adding
    LookupDelegates via this method. Each registered LookupDelegate
    will be consulted in the order in which they are registered. The
    ApplicationContext has no facility itself for performing a lookup( ),
    and so at least one LookupDelegate must be registered in order for
    lookup( ) to succeed.
    Parameters:
        delegate - the LookupDelegate to be registered
getClassLoader( )
    Retrieves a reference to the ClassLoader for the sub-application. This
    generally corresponds to the ClassLoader used to load the
    ApplicationContext itself.
    Returns the ClassLoader for the application FIG. 3 is a flow diagram illustrating the processing of the initialization routine of the dispatcher in one embodiment. The initialization routine is invoked when the dispatching system is first initialized on the web server. In block 301, the routine opens the sub-application configuration file. In blocks 302-309, the routine loops processing the entry for each sub-application in the configuration file. In block 302, the component selects the next sub-application in the configuration file. In decision block 303, if all the sub-applications have already been selected, then the routine returns, else the routine continues at block 304. In blocks 304-306, the routine loops retrieving each initialization parameter for the selected sub-application. In block 304, the routine selects the next parameter for the selected sub-application. In decision block 305, if all the parameters have already been selected, then the routine continues at block 307, else the routine continues at block 306. In block 306, the routine retrieves the value of the parameter from the configuration file and loops to block 304 to select the next parameter. In block 307, the routine retrieves the class definition for the selected sub-application from the sub-application definition file. In block 308, the routine instantiates an object of the retrieved class and initializes the object with the retrieved parameter values. The initialization process includes instantiation of an application context object and passing that same application context object to each sub-application. In block 309, the routine retrieves and saves the match criteria for the selected sub-application. The routine then loops to block 302 to select the next sub-application.

Figure 4:
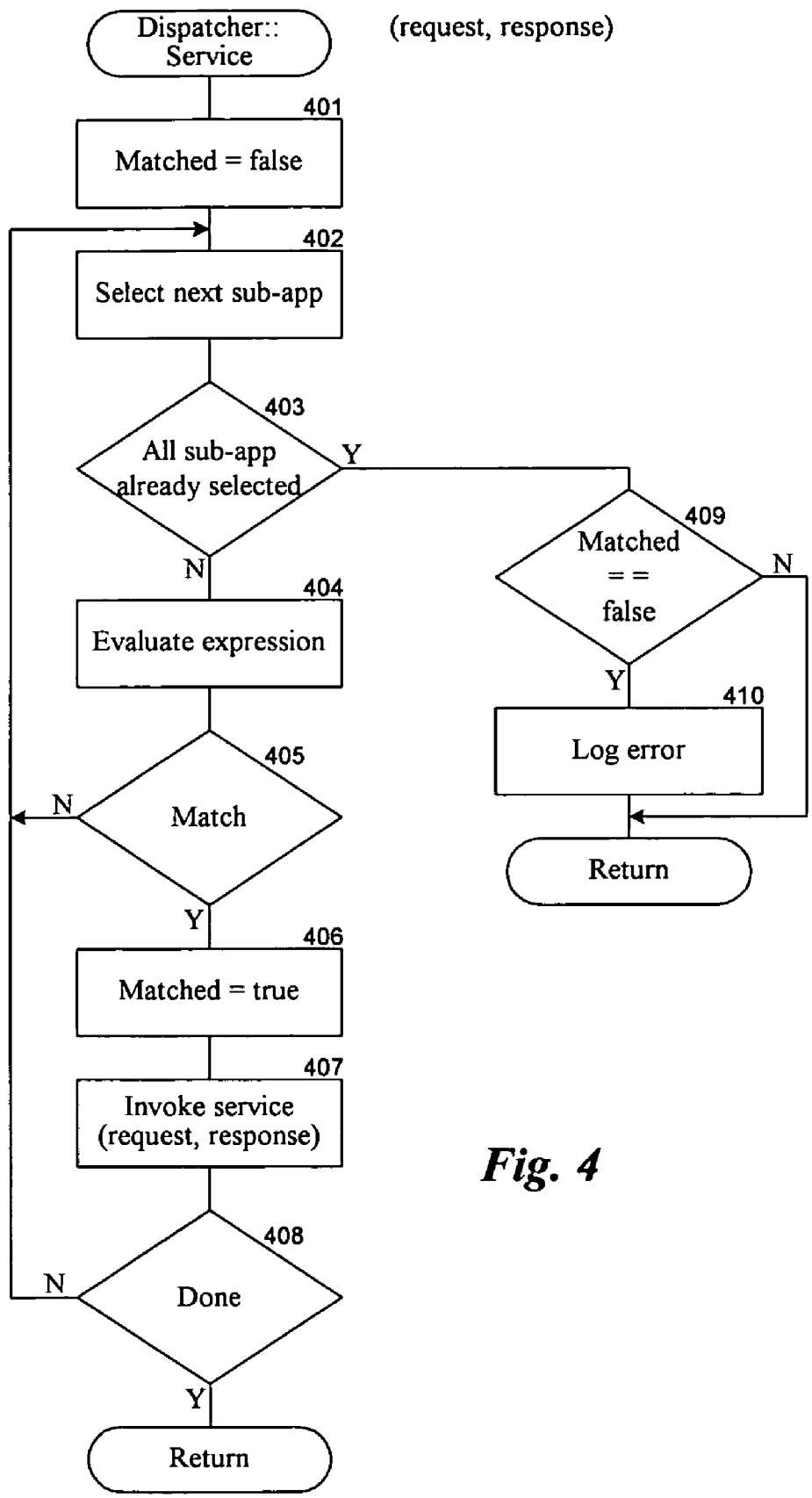
FIG. 4 is a block diagram illustrating a service routine of the dispatcher in one embodiment.

FIG. 4 is a block diagram illustrating a service routine of the dispatcher in one embodiment. The service routine is invoked by the server environment and is passed the received request and returns a response. The routine loops processing each sub-application by determining whether the match criteria for the sub-application matches the passed request and if so, invokes the service routine of the sub-application. In block 401, the routine sets a matched flag to false. This flag is used to indicate whether the match criteria for any sub-application matched the request. If not, the routine logs an error message. In block 402, the routine selects the next sub-application. In decision block 403, if all the sub-applications have already been selected, then the routine continues at block 409, else the routine continues at block 404. In block 404, the routine evaluates the match criteria for the selected sub-application. In decision block 405, if the match criteria matches the passed request, then the routine continues at block 406, else the routine loops to block 402 to select the next sub-application. In block 406, the routine sets the matched flag to true to indicate that the match criteria of at least one sub-application matched the passed request. In block 407, the routine invokes the service routine of the sub-application passing the request and receiving a response in return. In decision block 408, if the processing of the request is complete, then the routine returns, else the routine loops to block 402 to select the next sub-application. The processing of the request may be complete if the invoked sub-application returns a completion indication or provides a response to the request. In decision block 409, if the matched flag is false, then the routine logs the error in block 410 and returns, else the routine just returns.

From the above description, it will be appreciated that all the specific embodiments of the dispatching system have been described for purposes of illustration, various modifications may be made without deviating from the scope of the invention. One skilled in the art will appreciate that the sub-application can implement a wide variety of behaviors such as protocol translation, logging, business rules, authentication, and so on. Also, the dispatcher and sub-applications may operate in the framework described in U.S. patent application Ser. No. 09/753,037, entitled "Application Architecture" filed on Dec. 28, 2000. Accordingly, the invention is not limited except by the following claims.

The invention claimed is:

1. A method in a computer system for dispatching requests to perform services to sub-applications that use different logic models the method comprising:
    providing a context for the sub-applications
    receiving a request from a client computer to perform a service; and
    for a plurality of sub-applications,
        determining whether the received request should be dispatched to the sub-application; and when it is determined that the request should be dispatched to the sub-application, invoking a service routine of the sub-application passing the request whereby the sub-applications share the provided context;

wherein the determining includes determining whether a match criteria for the sub-application matches the received request;

wherein the requests are HTTP requests with a URL and the match criteria is a regular expression relating to the URL;

wherein a respective service routine is invoked for the request with respect to each of at least two of the sub-applications;

wherein the sub-applications are ordered and the invoking of the service routines of the at least two sub-applications is performed in the order of the sub-applications; and wherein when it is determined that the request should not be dispatched to any sub-application, an error is logged.

2. A computer system for dispatching HTTP requests to sub-applications, comprising:

a configuration file having a class, initialization parameters, and a match criteria associated with the sub-applications;

an initialization component that instantiates an object of the class for each sub-application in the configuration file, the instantiated object being initialized with the initialization parameters for the sub-application and being provided with a context object, the context object being shared by the instantiated objects so that the sub-applications share a common context;

a dispatcher that receives HTTP requests from client computers and, when the received HTTP request matches a match criteria of a sub-application, invokes a service routine of the instantiated object of the class associated with the sub-application;

said dispatcher logging an error if the HTTP request does not match any match criteria;

a memory to store the configuration file, the initialization component, and the dispatcher; and a processor to execute the configuration file, the initialization component, and the dispatcher;

wherein the match criteria is a regular expression relating to a URL of the HTTP request;

wherein a respective service routine is invoked for at least one of the HTTP requests with respect to each of at least two of the sub-applications; and wherein the configuration file specifies an ordering of the sub-applications and the dispatcher invokes the service routines of the instantiated objects of the classes associated with the at least two sub-applications in the specified order.

3. A computer system for processing request messages, comprising:

a plurality of sub-applications forming an application, a sub-application having a match criteria indicating when the sub-application should process a request and having a service routine to invoke when the match criteria indicates that the sub-application should process the request, the sub-applications using disparate logic models;

a context for the application that is shared by the sub-applications;

a dispatcher that receives requests from client computers, evaluates the match criteria to identify which sub-applications have match criteria that match the requests, and invokes the service routines of the identified sub-applications wherein invoked sub-applications use the context;

a memory to store the plurality of sub-applications, the context and the dispatcher; and a processor to execute the plurality of sub-applications, the context and the dispatcher;

wherein the requests are HTTP requests with a URL and the match criteria is a regular expression relating to the URL;

wherein a respective service routine is invoked for at least one of the requests with respect to each of at least two of the sub-applications; and wherein the sub-applications are ordered and the dispatcher invokes the service routines of the at least two sub-applications based on the order of the sub-applications.

4. The computer system of claim 3 wherein an invoked service routine indicates that additional service routines should not be invoked to process the received request.

5. The computer system of claim 3 wherein the dispatcher does not invoke additional service routines when an invoked service routine responds to a received request.

6. A computer-readable medium having instructions for controlling a computer system to dispatch requests to perform services to service routines, comprising:

program means for receiving a request from a client computer to perform a service; and for a plurality of service routines, program means for retrieving a match criteria for the service routine;

program means for determining whether the received request matches the retrieved match criteria;

when it is determined that the request matches the retrieved match criteria, invoking the service routine for processing of the received request;

whereby the service routines form an application and share a common context;

wherein the requests are HTTP requests with a URL and the match criteria is a regular expression relating to the URL;

wherein at least one of the requests is processed by at least two of the service routines;

wherein the service routines are ordered and the invoking of the at least two service means is performed in the order of the service routines; and wherein when it is determined that the request does not match any retrieved match criteria, an error is logged.

* * * * *